(12) United States Patent
Crichton et al.

(10) Patent No.: US 9,286,356 B1
(45) Date of Patent: *Mar. 15, 2016

(54) ADJUSTING A RANKING OF SEARCH RESULTS

(71) Applicant: Google Inc., Mountain View, CA (US)

(72) Inventors: Daniel M. Crichton, Eden Prairie, MN (US); Frances B. Haugen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/472,677

(22) Filed: Aug. 29, 2014

Related U.S. Application Data

(63) Continuation of application No. 13/613,242, filed on Sep. 13, 2012, now Pat. No. 8,825,644.

(60) Provisional application No. 61/547,395, filed on Oct. 14, 2011.

(51) Int. Cl.
*G06F 17/30* (2006.01)

(52) U.S. Cl.
CPC .................................. *G06F 17/3053* (2013.01)

(58) Field of Classification Search
CPC ..................... G06F 17/30029; G06F 17/30761; G06F 17/30867
USPC .................................................. 707/732, 735
See application file for complete search history.

(56) References Cited

U.S. PATENT DOCUMENTS

| | | | |
|---|---|---|---|
| 6,182,068 B1 * | 1/2001 | Culliss | 707/721 |
| 7,260,573 B1 * | 8/2007 | Jeh et al. | 707/708 |
| 7,584,177 B2 * | 9/2009 | Angelo et al. | |
| 8,825,644 B1 * | 9/2014 | Crichton et al. | 707/732 |
| 2006/0020693 A1 * | 1/2006 | Hellstrom | 709/223 |
| 2006/0042483 A1 * | 3/2006 | Work et al. | 101/91 |
| 2008/0172362 A1 * | 7/2008 | Shacham et al. | 707/3 |
| 2009/0119261 A1 | 5/2009 | Ismalon | |
| 2009/0144259 A1 | 6/2009 | Sundaresan | |
| 2009/0164929 A1 | 6/2009 | Chen et al. | |

(Continued)

OTHER PUBLICATIONS

David Carmel, Naama Zwerdling, Ido Guy, Shila Ofek-Koifman, Nadav Har'el, Inbal Ronen, Erel Uziel, Sivan Yogev, Sergey Chernov, "Title CIKM '09 Proceedings of the 18th ACM Conference: Personalized Social Search Based on the User's Social Network", 2009, ACM New York, NY, USA ©2009 ISBN: 978-1-60558-512-3 Order No. 605090 doi, pp. 1227-1236.*

Carmel et al., "Title CIKM '09 Proceedings of the 18th ACM Conference: Personalized Social Search Based on the Users Social Network," 2009, ACM, New York, NY, USA ©2009, 1227-1236.

(Continued)

*Primary Examiner* — Hosain Alam
*Assistant Examiner* — Robert F May
(74) *Attorney, Agent, or Firm* — Fish & Richardson P.C.

(57) ABSTRACT

A method performed by one or more processing devices includes obtaining search results responsive to a search query submitted by a user; determining a maturity score for the user, where the maturity score represents a measure of development of a particular user attribute; determining, based on the maturity score, utility scores for the search results, where a utility score represents a measure of utility of a particular type of content to a particular type of user as defined by the measure of development of the particular user attribute; and adjusting rankings of the search results based on the utility scores.

18 Claims, 4 Drawing Sheets

(56) References Cited

U.S. PATENT DOCUMENTS

| | | |
|---|---|---|
| 2009/0193014 A1* | 7/2009 | Menezes et al. .................. 707/5 |
| 2010/0211694 A1* | 8/2010 | Razmov et al. ............... 709/242 |
| 2011/0296463 A1 | 12/2011 | Suslov |
| 2012/0089617 A1 | 4/2012 | Frey |
| 2012/0240080 A1 | 9/2012 | O'Malley |
| 2013/0262242 A1 | 10/2013 | Tateo et al. |

OTHER PUBLICATIONS

Carmel et al., "Personalized social search based on the user's social network," Nov. 2, 2009, ACM New York, NY, USA, ISBN 978-1-60558-512-3.

File History of U.S. Appl. No. 13/613,242, filed on Sep. 13, 2012, downloaded on Sep. 3, 2014, 228 pages.

\* cited by examiner

ADJUSTING A RANKING OF SEARCH RESULTS

CLAIM OF PRIORITY

This application is a continuation of and claims priority under 35 U.S.C §120 to U.S. patent application Ser. No. 13/613,242, filed Sep. 13, 2012; which claims priority under 35 U.S.C. §119(e) to U.S. Provisional Patent Application No. 61/547,395, filed Oct. 14, 2011, the entire contents of each application are hereby incorporated by reference in their entirety.

BACKGROUND

This disclosure relates generally to adjusting a ranking of search results.

Search engines identify resources (e.g., images, audio, video, Web pages, text, documents) that are relevant to a user's needs and present information about the resources in a manner that is useful to the user. For example, a search engine returns a set of search results in response to a search query.

SUMMARY

In one aspect of the present disclosure, a method performed by one or more processing devices includes obtaining search results responsive to a search query submitted by a user; determining a maturity score for the user, where the maturity score represents a measure of development of a particular user attribute; determining, based on the maturity score, utility scores for the search results, where a utility score represents a measure of utility of a particular type of content to a particular type of user as defined by the measure of development of the particular user attribute; and adjusting rankings of the search results based on the utility scores.

Implementations of the disclosure can include one or more of the following features. In some implementations, the method also includes receiving information identifying the user requesting the search query; wherein determining the maturity score includes: determining, at least partly based on the information identifying the user, user attributes of the user; and determining, based on the user attributes, the maturity score for the user.

In other implementations, the search results are ranked in accordance with the relevance scores, and wherein adjusting includes: re-ordering the search results ranked in accordance with the relevance scores. In still other implementations, the measure of development of the particular user attribute includes a measure of development in a social networking service of the particular user attribute.

In some implementations, the method further includes executing a policy including instructions for calculating, based on the maturity score, the utility scores; wherein determining the utility scores includes determining, based on executing, the utility scores. In other implementations, the user includes a first user, the maturity score includes a first maturity score, the utility scores include first utility scores, and wherein the method further includes: determining a second maturity score for a second user requesting the search query; determining, based on the second maturity score, second utility scores for the search results; and adjusting the rankings of the search results based on the second utility scores; wherein the adjusted rankings of the search results based on the second utility scores vary from the adjusted rankings of the search results based on the first utility scores.

In still another aspect of the disclosure, one or more machine-readable media are configured to store instructions that are executable by one or more processing devices to perform operations including obtaining search results responsive to a search query submitted by a user; determining a maturity score for the user, where the maturity score represents a measure of development of a particular user attribute; determining, based on the maturity score, utility scores for the search results, where a utility score represents a measure of utility of a particular type of content to a particular type of user as defined by the measure of development of the particular user attribute; and adjusting rankings of the search results based on the utility scores. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: obtaining search results responsive to a search query submitted by a user; determining a maturity score for the user, where the maturity score represents a measure of development of a particular user attribute; determining, based on the maturity score, utility scores for the search results, where a utility score represents a measure of utility of a particular type of content to a particular type of user as defined by the measure of development of the particular user attribute; and adjusting rankings of the search results based on the utility scores. Implementations of this aspect of the present disclosure can include one or more of the foregoing features.

In yet another aspect of the disclosure, an electronic system includes means for means for obtaining search results responsive to a search query submitted by a user; means for determining a maturity score for the user, where the maturity score represents a measure of development of a particular user attribute; means for determining, based on the maturity score, utility scores for the search results, where a utility score represents a measure of utility of a particular type of content to a particular type of user as defined by the measure of development of the particular user attribute; and means for adjusting rankings of the search results based on the utility scores. Implementations of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

One of more of the following advantages may be realized by the techniques described herein. In an example, the system implements a policy that promotes the viewing of particular types of content by particular types of users (e.g., users associated with particular attributes). In accordance with the policy, the system adjusts a ranking of search results based on attributes of a user submitting a search query. That is, the system uses the attributes to adjust a ranking of search results to promote the goals of the policy, e.g., by ranking search results for the particular types of content for the particular types of users as having increased relevance relative to other search results for other types of content for the particular types of users.

Based on attributes of the user, the system customizes (e.g., adjusts) the ranking of search results for a user. Through the customized ranking, the system targets particular types of content to particular users, e.g., by ranking search results for the particular types of content for the particular users as having an increased relevance relative to other search results for other types of content for the particular users.

By adjusting a ranking of search results based on attributes of a user, the system is able to increase a probability of a user viewing content (e.g., content associated with a search result) that has increased relevance for the user. Using the ranking of search results that is dependent on the user attributes, the system presents the user with search results having increased relevance to the user, e.g., relative to a ranking of search results that is independent of the user attributes.

The details of one or more implementations are set forth in the accompanying drawings and the description below. Other features, objects, and advantages will be apparent from the description and drawings, and from the claims.

BRIEF DESCRIPTION OF DRAWINGS

Like reference symbols and designations in the various drawings indicate like elements.

DETAILED DESCRIPTION

A system consistent with this disclosure adjusts a ranking of search results based on a maturity score of a user submitting a search query. Generally, a maturity score includes a measure of development of a particular user attribute of the user submitting the search query. Maturity scores may be based on various attributes of the user. Generally, an attribute includes a characteristic or a quality of a user. In an example, the maturity score may be based on an amount of time the user has been registered with the system.

In a social networking context, the maturity score may be based on a number of social connections the user has to other users of the system. Generally, a social connection includes a relationship between nodes in a graph representing users of the social networking service. In this example, the maturity score of the user is proportional to the number of social connections of the user. As the number of social connections of the user increases, the maturity score of the user also increases. In this example, an increased maturity score may be indicative of an increased level of credibility, an increased level of trustworthiness, an increased level of user development in the social network, and so forth.

Figure 1:
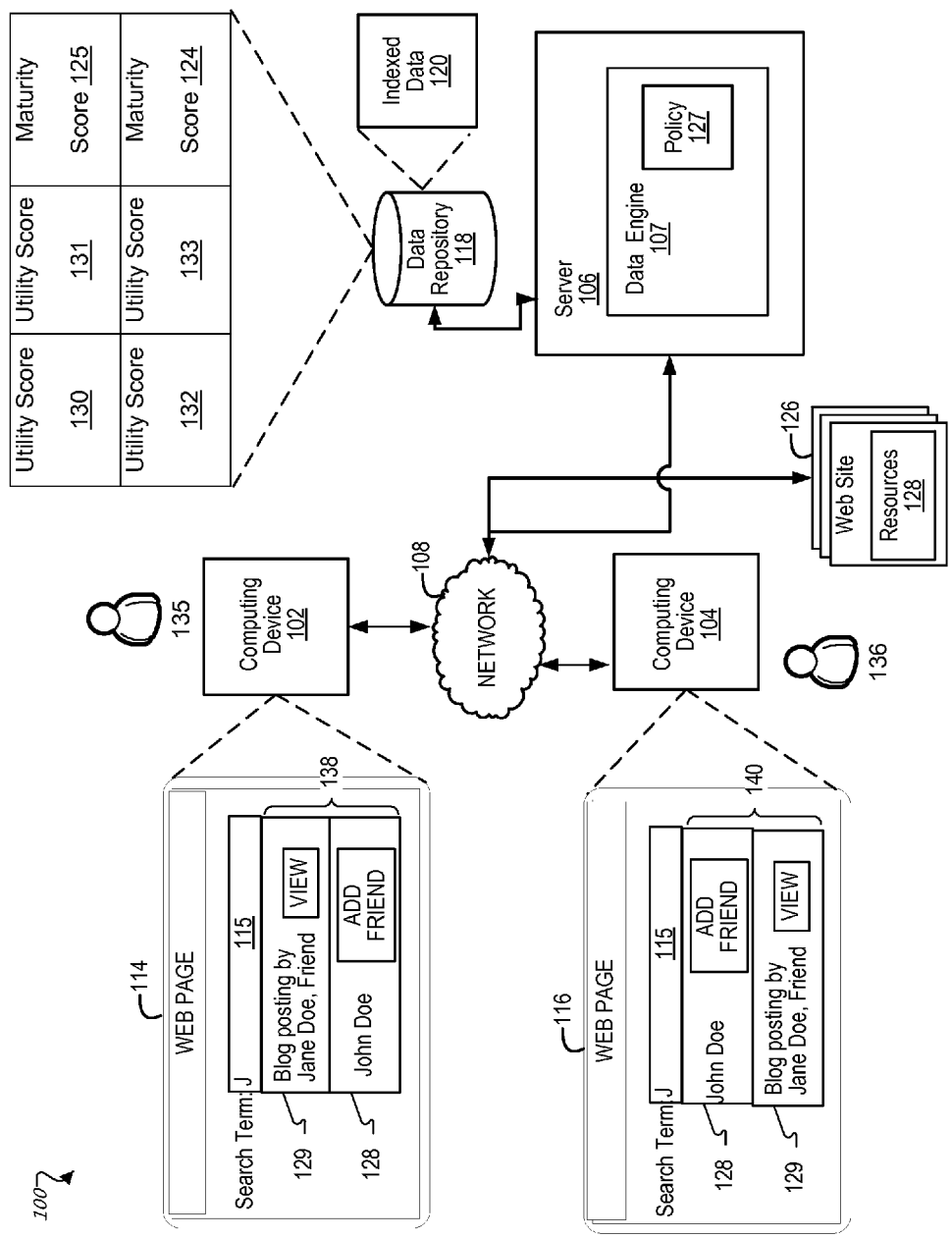
FIG. 1 is a diagram of an example of a network environment for adjusting a ranking of search results.

FIG. 1 is a diagram of an example of a network environment 100 for adjusting a ranking of search results. Network environment 100 includes computing devices 102, 104, server 106, and network 108. Network environment 100 also includes web site 126 of a content publisher (not shown). Web site 126 may be hosted by server 102 and/or by other servers (not shown). Web site 126 include resources 128, including, e.g., web pages, news articles, documents, files, images, and so forth.

Computing devices 102, 104 can each communicate with server 106 over network 108. Users 135, 136 of computing devices 102, 104 may use computing devices 102, 104 to view and to access web site 126 over network 108. Network environment 100 may include many thousands of web sites, computing devices and servers, which are not shown.

Server 106 includes data engine 107 for adjusting rankings of search results, e.g., based on users' maturity scores. Server 106 may also include a search engine (not shown) for crawling, indexing, and ranking resources 128 in web site 126.

In an example, data engine 107 may be a component of the search engine. In another example, data engine 107 may be a component that is independent of the search engine. Although data engine 107 is shown as a single component in FIG. 1, data engine 107 can exist in one or more components, which can be distributed and coupled by network 108.

A search engine (now shown) crawls web site 126 to identify content in resources 128. Using the content in resources 128, the search engine generates indexed data 120. Indexed data 120 includes an index of data describing the contents of resources 128. The search engine stores indexed data 120 in a data repository 118. In the example of FIG. 1, data repository 118 may also store cached copies of resources 128.

In the example of FIG. 1, web site 126 includes a web site for a social networking service. Users 135, 136 of computing devices 102, 104 access web site 126 to create user profiles in the social networking service and to establish social connections with other users of the social networking service. Through web site 126, users 135, 136 may also view other profiles of other users of the social networking service. In this example, indexed data 120 includes data pertaining to the social networking service, including, e.g., profile pages of users of the social networking service.

In the example of FIG. 1, user 135 uses computing device 102 to access one of resources 128 in web site 126. The resource accessed by computing device 102 is rendered by computing device 102 as graphical user interface 114. User 136 also uses computing device 104 to access one of resources 128. The resource accessed by computing device 104 is rendered by computing device 104 as graphical user interface 116.

Graphical user interfaces 114, 116 include search box 115 for input of a search query. In the example of FIG. 1, users 135, 136 of computing devices 102, 104 input a search query into search box 115, including, e.g., a search query including the character "J." Using contents of the search query, the search engine searches indexed data 120 for resources that are relevant to the search query. The search engine identifies in indexed data 120 resources that are relevant to the search query. Using contents of the identified resources, the search engine generates search results 128, 129.

In an example, a search result for a resource includes data specifying a title of the resource, a snippet of text from the resource or a portion of an image extracted from the resource, and a Unified Resource Location (URL) of the resource. In the example of FIG. 1, search result 128 includes a search result for a resource for establishing a social connection. Search result 129 includes a search result for a profile page.

In this example, the search engine generates relevance scores for search results 128, 129, as indicated in the below Table 1. Generally, a relevance score includes a measure of responsiveness of an item of data to a search query, e.g., relative to measures of responsiveness of other items of data to the search query.

TABLE 1

| Search Result | Relevance Score |
|---|---|
| Search Result 128 | 2 |
| Search Result 129 | 1 |

As indicated in the above Table 1, the search engine generates relevance scores for search results 128, 129 independent of identities of users 135, 136. In another example, the search engine may generate relevance scores for the resources identified in response to the search query. In this example, the search engine assigns search results 128, 129 the relevance scores of the resources associated with search results 128, 129.

Using the relevance scores, the search engine generates a ranking of search results 128, 129 (e.g., a default ranking). In some implementations, the default ranking is obtained by data engine 107 from the search engine. In the default ranking, search result 128 is ranked as being more relevant than search result 129.

Data engine 107 may adjust the default ranking of search results 128, 129 for users 135, 136. To adjust the default ranking for user 135, data engine 107 generates maturity score 125 and utility scores 130-131. Generally, a utility score includes an estimated measure of usefulness (e.g., utility) of a type of content to a type of user, e.g. as defined by a measure of development of an attribute for the user For example, if maturity is defined based on the size of a user's social graph, a less mature user, e.g., a user with a social graph having a number of nodes less than a threshold number, may find content for establishing social connections more useful than content for viewing profile pages of other users. A more mature user, e.g., a user with a social graph having a number of nodes greater than a threshold number, may find content for viewing profile pages of other users more useful than content for establishing social connections.

To adjust the default ranking for user 136, data engine 107 generates maturity score 124 and utility scores 132-133. In an example, utility scores 130-133 are based on maturity scores 124, 125. Data engine 107 stores maturity scores 124, 125 and utility scores 130-133 in data repository 118.

Using utility scores 130-131 for user 135, data engine 107 adjusts the default ranking to generate ranking 138. Ranking 138 adjusts the default ranking by ranking search result 129 as being more relevant than search result 128. Using utility scores 132-133 for user 136, data engine 107 generates ranking 140. Ranking 140 maintains the default ranking by ranking search result 128 as being more relevant than search result 129.

In an example, data engine 107 generates maturity scores 124, 125 based on attributes pertaining to usage of web site 126 by users 135, 136. The attributes may include data specifying a number of social connections of users 135, 136, data specifying a period of time for which users 135, 136 have had profiles on web site 126, and so forth.

In an example, data engine 107 increases a maturity score by a value of one when the user has more than a specified number of social of connections, including, e.g., one-hundred social connections. Data engine 107 also increases the maturity score by a value of one when the user has had a profile on web site 126 for more than a pre-defined period of time, including, e.g., three months.

In this example, maturity scores 124, 125 are initialized to values of zero. In the example of FIG. 1, user 135 has more than one-hundred social connections with other users of web site 126 and has had a profile on web site 126 for more than three months. In this example, data engine 107 increases maturity score 125 for user 135 from a value of zero to a value of one, as indicated in the below Table 2.

In this example, user 136 has less than one-hundred social connections with other users of web site 126 and has had a profile on web site 126 for more than three months. In this example, data engine 107 increases maturity score 124 for user 136 from a value of zero to a value of one, as indicated in the below Table 2.

TABLE 2

| User | Maturity Score |
|---|---|
| User 135 | Maturity Score 125 = 2 |
| User 136 | Maturity Score 124 = 1 |

Data engine 107 may use maturity scores 124, 125 in generating utility scores 130-133 for search results 128, 129. Data engine 107 may also use numerous other factors in generating utility scores 130-133, including, e.g., types of content associated with search results 128, 129. In an example, data engine 107 may implement policy 127 that specifies how maturity scores 124, 125 and the types of content are used in calculating utility scores 130-133.

Generally, a policy includes a set of instructions. In this example, policy 127 includes a social connection instruction. Generally, a social connection instruction specifies a calculation of utility scores for search results for resources for establishing social connections, as indicated in the below Table 3. Policy 127 also includes profile page instruction. Generally, a profile page instruction specifies a calculation of utility scores for search results for profile pages, as also indicated in the below Table 3.

TABLE 3

| Instruction Name | Utility Score Instruction |
|---|---|
| Social Connection Instruction | Utility score = 1/maturity score |
| Profile Page Instruction | Utility score = maturity score |

As shown in the above Table 3, the social connection instruction specifies that the utility score of a search result for a social connection is inversely proportional to the maturity score. In this example, a utility score for a search result for a social connection decreases as a maturity score of a user increases. Through the social connection instruction, policy 127 promotes establishment of social connections by users with decreased maturity scores, e.g., relative to other maturity scores of other users.

The profile page instruction specifies that the utility score of a search result for a profile page is proportional to the maturity score. In this example, a utility score for a search result for a profile page increases as a maturity score of a user increases. Through the profile page instruction, policy 127 promotes viewing of content (e.g., profile pages) by users with increased maturity scores, e.g., relative to other maturity scores of other users.

Data engine 107 executes policy 127 to generate utility scores 130-133, as indicated in the below Table 4.

TABLE 4

| User | Maturity Score | Search Result | Utility Score |
|---|---|---|---|
| User 135 | Maturity Score 125 = 2 | Search Result 128 | Utility score 130 = .5 (Utility score 130 = 1/ (maturity score 125)) |

TABLE 4-continued

| User | Maturity Score | Search Result | Utility Score |
|---|---|---|---|
| | | Search Result 129 | Utility score 131 = 2 (Utility score 131 = maturity score 125) |
| User 136 | Maturity Score 124 = 1 | Search Result 128 | Utility score 132 = 1 (Utility score 132 = 1/ (maturity score 124)) |
| | | Search Result 129 | Utility score 133 = 1 (Utility score 133 = maturity score 124) |

As shown in the above Table 4, data engine 107 generates utility scores 130-133 based on execution of the social connection and profile page instructions in policy 127. In this example, search result 128 includes content for establishing a social connection. Based on the content in search result 128, data engine 107 determines that the social connection instruction in policy 127 is used in generating utility scores 130, 132 for search result 128.

As previously described, utility score 130 includes an estimated measure of utility derived by user 135 from selecting search result 128. Utility score 132 includes an estimated measure of utility derived by user 136 from selecting search result 128. As indicated in the above Table 4, utility scores 130, 132 vary based on maturity scores 124, 125, for users 135, 136. In this example, utility score 132 is greater than utility score 130. The variation in utility scores 130, 132 specifies that user 136 is estimated to derive an amount of utility by establishing a social connection that is greater than an amount of utility estimated to be derived by user 135 establishing a social connection.

In this example, search result 129 is for a profile page. Based on the content in search result 129, data engine 107 determines that the profile page instruction in policy 127 is used in generating utility scores 131, 133 for search result 129.

As previously described, utility score 131 includes an estimated measure of utility derived by user 135 from selecting search result 129. Utility score 133 includes an estimated measure of utility derived by user 136 from selecting search result 129. As indicated in the above Table 4, utility scores 131, 133 vary based on maturity scores 124, 125, for users 135, 136. In this example, utility score 131 is greater than utility score 133. The variation in utility scores 131, 133 specifies that user 135 is estimated to derive an amount of utility by viewing a profile page that is greater than an amount of utility estimated to be derived by user 136 viewing the profile page.

Using utility scores 130-133, data engine 107 generates adjusted relevance scores. Generally, an adjusted relevance score includes an adjustment to a relevance score. In an example, data engine 107 may generate adjusted relevance scores by using the utility scores to adjust the relevance scores. In this example, data engine 107 generates an adjusted relevance score by adding a utility score to a relevance score, as indicated in the below Table 5.

TABLE 5

| User | Search Result | Relevance Score | Utility Score | Adjusted Relevance Score |
|---|---|---|---|---|
| User 135 | Search Result 128 | 2 | .5 | 2.5 |
| | Search result 129 | 1 | 2 | 3 |
| User 136 | Search Result 128 | 2 | 1 | 3 |
| | Search result 129 | 1 | 1 | 2 |

The above Table 5 provides adjusted relevance scores for search results 128, 129 as displayed in graphical user interfaces 114, 116 for users 135, 136. For user 135, search result 129 has an adjusted relevance score that is higher than the adjusted relevance score for search result 128. Using the adjusted relevance scores associated with user 135, data engine 107 generates ranking 138, in which search result 129 is ranked as being more relevant than search result 128. In ranking 138, data engine 107 adjusts the default ranking of search results 128, 129. As described herein, the default ranking of search results 128, 129 by may obtained by data engine 107 from the search engine.

For user 136, search result 128 has an adjusted relevance score that is higher than the adjusted relevance score for search result 129. Using the adjusted relevance scores, data engine 107 generates ranking 140. By ranking search result 128 as being more relevant than search result 129, ranking 140 maintains the default ranking of search results 128, 129.

Other implementations are possible. For example, the above examples describe policies for a profile page but similar policies can be used for other content/resources that are more likely to be relevant to a particular user, e.g., a more mature or a less mature user. Particular examples include policies that specify a ranking of content in an activity stream of a social network for the particular user. Generally, an activity stream includes a portion of a website that displays a list of recent activities performed by users of a social network. In another example, the policies specify a ranking (for particular users) for search results related to blog postings, news alerts, articles posted by users, event invitations, event reminders, status updates, and so forth.

Figure 2:
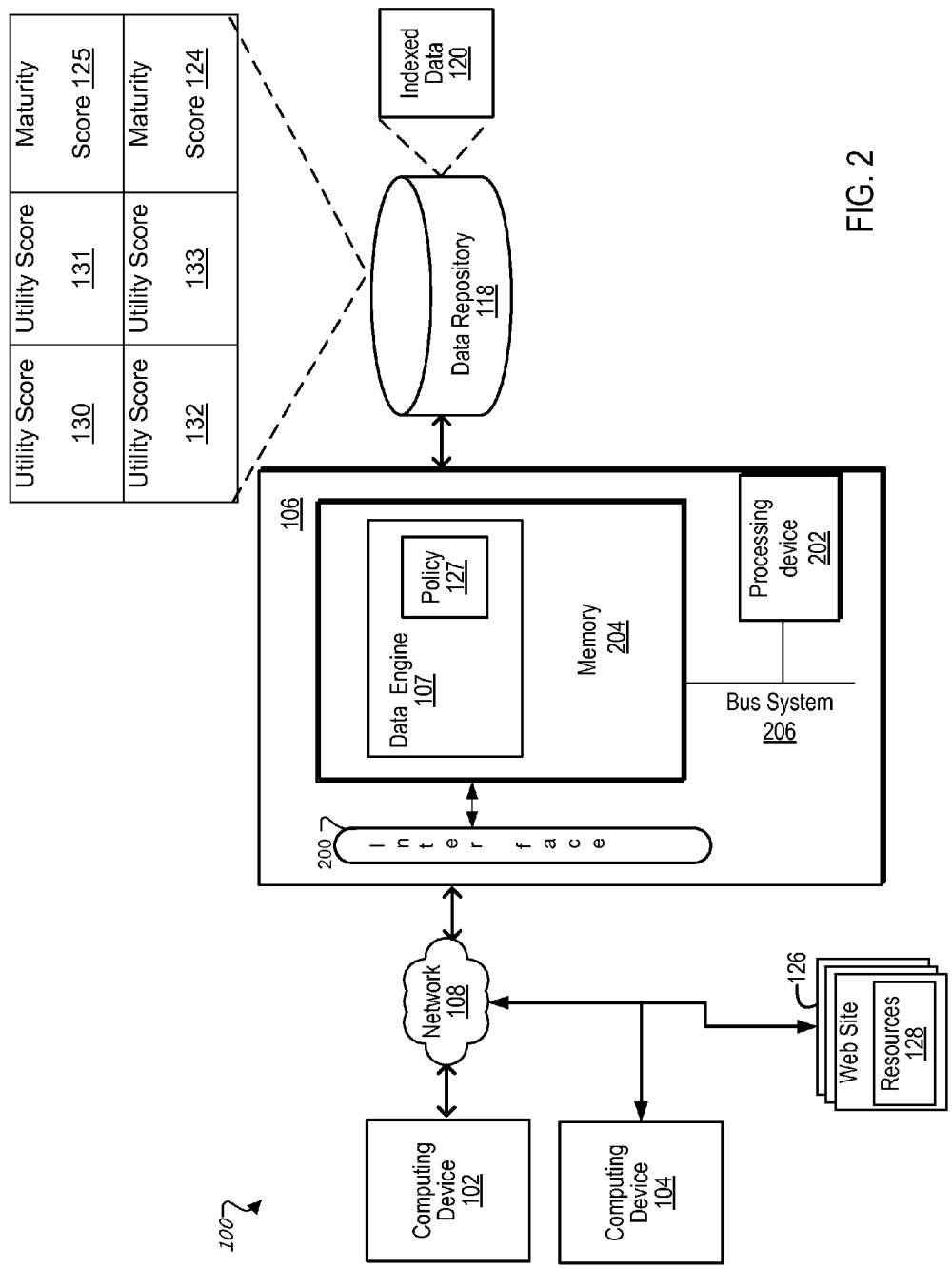
FIG. 2 is a block diagram showing examples of components of a network environment for adjusting a ranking of search results.

FIG. 2 is a block diagram showing examples of components of network environment 100 for adjusting a ranking of search results. In the example of FIG. 2, graphical user interfaces 114, 116, contents of graphical user interfaces 114, 116, and users 135, 136 are not shown.

Computing devices 102, 104 be a computing device capable of taking input from a user and communicating over network 108 with server 106 and/or with other computing devices. For example, computing devices 102, 104 can be mobile devices, desktop computers, laptops, cell phones, personal digital assistants (PDAs), servers, embedded computing systems, a mobile devices, and the like. Network environment 100 can include a plurality of computing devices, which can be geographically dispersed.

Network 108 can include a large computer network, including, e.g., a local area network (LAN), wide area network (WAN), the Internet, a cellular network, or a combination thereof connecting a number of mobile computing devices, fixed computing devices, and server systems. The network(s) may provide for communications under various modes or protocols, including, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, including, e.g., using a Bluetooth, WiFi, or other such transceiver.

Server 106 can be a variety of computing devices capable of receiving data and running one or more services, which can be accessed by computing devices 102, 104. In an example, server 106 can include a server, a distributed computing system, a desktop computer, a laptop, a cell phone, a rack-mounted server, and the like. Server 106 can be a single server or a group of servers that are at a same location or at different locations. Computing devices 102, 104 and server 106 can run programs having a client-server relationship to each other. Although distinct modules are shown in the figures, in some examples, client and server programs can run on the same device.

Server 106 can receive data from computing devices 102, 104 through input/output (I/O) interface 200. I/O interface 200 can be a type of interface capable of receiving data over a network, including, e.g., an Ethernet interface, a wireless networking interface, a fiber-optic networking interface, a modem, and the like. Server 106 also includes a processing device 202 and memory 204. A bus system 206, including, for example, a data bus and a motherboard, can be used to establish and to control data communication between the components of server 106.

Processing device 202 can include one or more microprocessors. Generally, processing device 202 can include an appropriate processor and/or logic that is capable of receiving and storing data, and of communicating over a network (not shown). Memory 204 can include a hard drive and a random access memory storage device, including, e.g., a dynamic random access memory, or other types of non-transitory machine-readable storage devices. As shown in FIG. 2, memory 204 stores computer programs that are executable by processing device 202. These computer programs include data engine 107, a search engine (not show), and so forth. Data engine 107 can be implemented in software running on a computer device (e.g., server 106), hardware or a combination of software and hardware.

Figure 3:
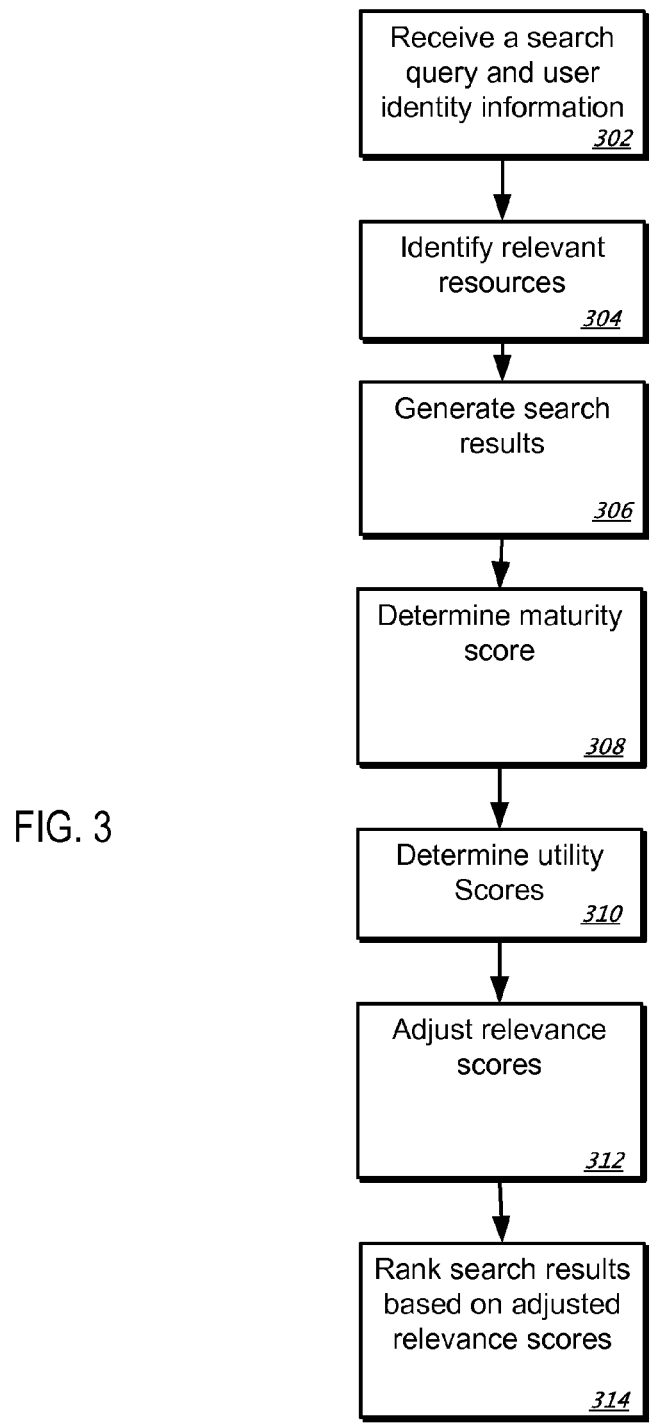
FIG. 3 is a flow chart of an example process for adjusting a ranking of search results.

FIG. 3 is a flow chart of an example process 300 for adjusting a ranking of search results 128, 129 for display in graphical user interfaces 114, 116. In operation, the search engine of server 106 receives (302) a search query from computing devices 102, 104. In an example, computing devices 102, 104 generate the search query in response to users 135, 136 inputting search terms into search box 115 of graphical user interfaces 114, 116.

In this example, computing devices 102, 104 may also send to server 106 information identifying users 135, 136. In this example, computing devices 102, 104 store cookies including data that uniquely identifies users 135, 136. The cookies may include data specifying usernames and/or passwords for users 135, 136. Computing devices 102, 104 retrieve from the cookies the data that uniquely identifies users 135, 136 and send the data to server 106. In some examples, users can opt-in or opt-out of computing devices 102, 104 retrieving data from the cookies. In another example, the data from the cookies can be anonymized to promote privacy of users, e.g., prior to being sent to data engine 107.

Server 106 receives the search query and the data that uniquely identifies users 135, 136. Using the search query, the search engine identifies (304) which of resources 128 are relevant to the search query. The search engine may use numerous factors in determining relevance of resources 128 to the search query. The factors may include a similarity and/or a match among search terms in the search query and content in resources 128.

In an example, the search engine searches indexed data 120 in data repository 118 to identify data describing contents of resources 128 that is relevant to the search query. The search engine also generates (306) search results 128, 129 based on the identified resources. The search engine generates relevance scores for search results 128, 129. The search engine sends the search results, a ranking of the search results, and the relevance scores to data engine 107.

Using the data that uniquely identifies users 135, 136, data engine 107 determines attributes (not shown) of users 135, 136. In an example, data repository 118 stores attributes of users 135, 136 and associates the attributes with the data that uniquely identifies users 135, 136. Data engine 107 determines a match between data stored in data repository 118 that uniquely identifies user 135 and data received from computing device 102 that also uniquely identifies user 135. Based on the match, data engine 107 identifies attributes for user 135.

In an example, users 135, 136 can opt-in or opt-out of data engine 107 receiving and/or determining attributes. In another example, attributes (not shown) of users 135, 136 can be anonymized to promote privacy of users. In this example, the system implements a hashing function to encrypt attributes (not shown) of users 135, 136 and other content that the system identifies to anonymize.

Using the attributes for users 135, 136, data engine 107 determines (308) maturity scores 124, 125. Using maturity scores 124, 125, data engine 107 determines (310) utility scores 130-133, e.g., based on execution of policy 127. Based on utility scores 130-133, data engine 107 adjusts (312) relevance scores of search results 128, 129 for display in graphical user interfaces 114, 116, e.g., by an amount of utility scores. Based on the adjusted relevance scores, data engine 107 ranks the search results 128, 129, in accordance with the adjusted relevance scores. In an example, data engine 107 ranks the search results 128, 129, in accordance with the adjusted relevance scores, by adjusting default rankings of search results 128, 129 for display in graphical user interfaces 114, 116.

Using the techniques described herein, a system in configured to adjust a ranking of search results based on a maturity score of a user viewing the search results.

Figure 4:
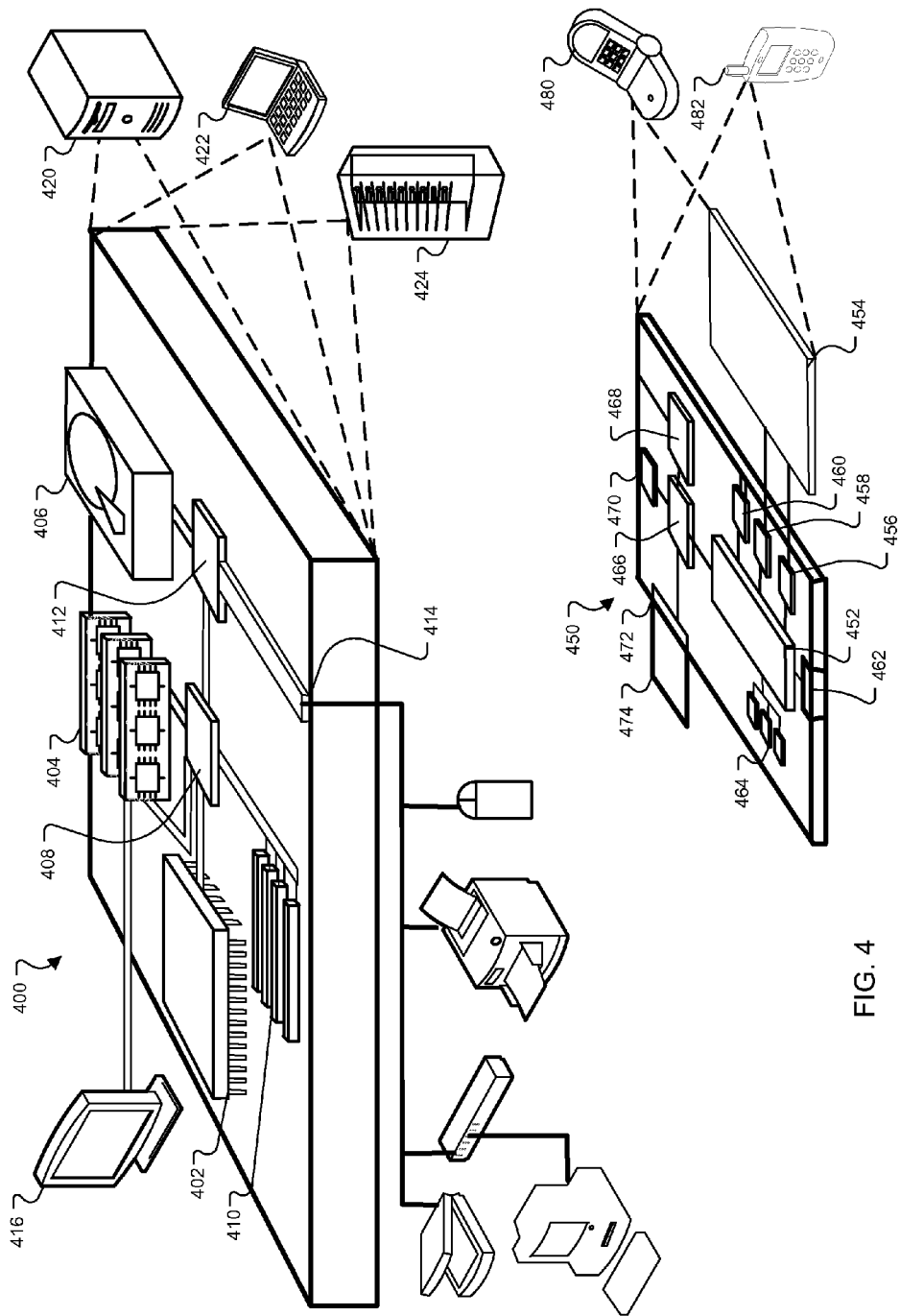
FIG. 4 shows an example of a computer device and a mobile computer device that can be used to implement the techniques described herein.

FIG. 4 shows an example of computer device 400 and mobile computer device 450, which can be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 400 includes processor 402, memory 404, storage device 406, high-speed interface 408 connecting to memory 404 and high-speed expansion ports 410, and low speed interface 412 connecting to low speed bus 414 and storage device 406. Each of components 402, 404, 406, 408, 410, and 412, are interconnected using various busses, and can be mounted on a common motherboard or in other manners as appropriate. Processor 402 can process instructions for execution within computing device 400, including instructions stored in memory 404 or on storage device 406 to display graphical data for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations (e.g., as a server bank, a group of blade servers, or a multi-processor system).

Memory 404 stores data within computing device 400. In one implementation, memory 404 is a volatile memory unit or units. In another implementation, memory 404 is a non-volatile memory unit or units. Memory 404 also can be another form of computer-readable medium, such as a magnetic or optical disk.

Storage device 406 is capable of providing mass storage for computing device 400. In one implementation, storage device 406 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an data carrier. The computer program product also can contain instructions that, when executed, perform one or more methods, such as those described above. The data carrier is a computer- or machine-readable medium, such as memory 404, storage device 406, memory on processor 402, and the like.

High-speed controller 408 manages bandwidth-intensive operations for computing device 400, while low speed controller 412 manages lower bandwidth-intensive operations. Such allocation of functions is an example only. In one implementation, high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth®, Ethernet, wireless Ethernet), can be coupled to one or more input/output devices, such as a keyboard, a pointing device, a scanner, or a networking device such as a switch or router, e.g., through a network adapter.

Computing device 400 can be implemented in a number of different forms, as shown in the figure. For example, it can be implemented as standard server 420, or multiple times in a group of such servers. It also can be implemented as part of rack server system 424. In addition or as an alternative, it can be implemented in a personal computer such as laptop computer 422. In some examples, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes processor 452, memory 464, an input/output device such as display 454, communication interface 466, and transceiver 468, among other components. Device 450 also can be provided with a storage device, such as a microdrive or other device, to provide additional storage. Each of components 450, 452, 464, 454, 466, and 468, are interconnected using various buses, and several of the components can be mounted on a common motherboard or in other manners as appropriate.

Processor 452 can execute instructions within computing device 450, including instructions stored in memory 464. The processor can be implemented as a chipset of chips that include separate and multiple analog and digital processors. The processor can provide, for example, for coordination of the other components of device 450, such as control of user interfaces, applications run by device 450, and wireless communication by device 450.

Processor 452 can communicate with a user through control interface 458 and display interface 456 coupled to display 454. Display 454 can be, for example, a TFT LCD (Thin-Film-Transistor Liquid Crystal Display) or an OLED (Organic Light Emitting Diode) display, or other appropriate display technology. Display interface 456 can comprise appropriate circuitry for driving display 454 to present graphical and other data to a user. Control interface 458 can receive commands from a user and convert them for submission to processor 452. In addition, external interface 462 can communicate with processor 442, so as to enable near area communication of device 450 with other devices. External interface 462 can provide, for example, for wired communication in some implementations, or for wireless communication in other implementations, and multiple interfaces also can be used.

Memory 464 stores data within computing device 450. Memory 464 can be implemented as one or more of a computer-readable medium or media, a volatile memory unit or units, or a non-volatile memory unit or units. Expansion memory 474 also can be provided and connected to device 450 through expansion interface 472, which can include, for example, a SIMM (Single In Line Memory Module) card interface. Such expansion memory 474 can provide extra storage space for device 450, or also can store applications or other data for device 450. Specifically, expansion memory 474 can include instructions to carry out or supplement the processes described above, and can include secure data also. Thus, for example, expansion memory 474 can be provide as a security module for device 450, and can be programmed with instructions that permit secure use of device 450. In addition, secure applications can be provided via the SIMM cards, along with additional data, such as placing identifying data on the SIMM card in a non-hackable manner.

The memory can include, for example, flash memory and/or NVRAM memory, as discussed below. In one implementation, a computer program product is tangibly embodied in an data carrier. The computer program product contains instructions that, when executed, perform one or more methods, such as those described above. The data carrier is a computer- or machine-readable medium, such as memory 464, expansion memory 474, and/or memory on processor 452, that can be received, for example, over transceiver 468 or external interface 462.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, such as using a Bluetooth®, WiFi, or other such transceiver (not shown). In addition, GPS (Global Positioning System) receiver module 470 can provide additional navigation- and location-related wireless data to device 450, which can be used as appropriate by applications running on device 450.

Device 450 also can communicate audibly using audio codec 460, which can receive spoken data from a user and convert it to usable digital data. Audio codec 460 can likewise generate audible sound for a user, such as through a speaker, e.g., in a handset of device 450. Such sound can include sound from voice telephone calls, can include recorded sound (e.g., voice messages, music files, and the like) and also can include sound generated by applications operating on device 450.

Computing device 450 can be implemented in a number of different forms, as shown in the figure. For example, it can be implemented as cellular telephone 480. It also can be implemented as part of smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems and techniques discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

In some implementations, the engines described herein can be separated, combined or incorporated into a single or combined engine. The engines depicted in the figures are not intended to limit the systems described here to the software architectures shown in the figures.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more processing devices, comprising:
    determining, based on usage of a social network by a user, a maturity score for the user, where the maturity score represents a measure of user development of the user within the social network;
    for a particular type of content associated with a resource, retrieving, from a set of utility score instructions, a utility score instruction for the particular type of content;
        wherein the utility score instruction defines, for the particular type of content in the social network, a relationship between a utility score and the maturity score;
        wherein the utility score represents a measure of utility of the particular type of content to the user as defined by the measure of user development in the social network; and
        wherein the utility score is determined independent of user input;
    wherein defined relationships across the set of utility score instructions promote a first pre-defined type of content among less mature users of the social network relative to other maturities of other users of the social network and promote a second pre-defined type of content among more mature users of the social network relative to the other maturities of the other users of the social network; and
    determining, based on the set of utility score instructions and the maturity score, utility scores for resources that are accessible to the user.

2. The method of claim 1, further comprising:
    receiving information identifying the user;
    wherein determining the maturity score comprises:
        determining, at least partly based on the information identifying the user, user attributes of the user; and
        determining, based on the user attributes, the maturity score for the user.

3. The method of claim 1, further comprising:
ranking the resources based on the utility scores.

4. The method of claim 1, wherein the resources are ranked in accordance with relevance scores, and wherein the method further comprises:
adjusting rankings of the resources based on the utility scores.

5. The method of claim 1, wherein the utility score instructions comprise instructions for calculating, based on the maturity score, the utility scores; and
wherein determining the utility scores comprises:
determining, based on executing the utility score instructions, the utility scores.

6. The method of claim 1, wherein the user comprises a first user, the maturity score comprises a first maturity score, the utility scores comprise first utility scores, and wherein the method further comprises:
determining a second maturity score for a second user;
determining, based on the second maturity score, second utility scores for the resources; and
ranking the resources based on the second utility scores;
wherein the ranking of the resources based on the second utility scores vary from a ranking of the resources based on the first utility scores.

7. One or more non-transitory machine-readable hardware storage devices storing instructions that are executable by one or more processing devices to perform operations comprising:
determining, based on usage of a social network by a user, a maturity score for the user, where the maturity score represents a measure of user development of the user within the social network;
for a particular type of content associated with a resource,
retrieving, from a set of utility score instructions, a utility score instruction for the particular type of content;
wherein the utility score instruction defines, for the particular type of content in the social network, a relationship between a utility score And the maturity score;
wherein the utility score represents a measure of utility of the particular type of content to the user as defined by the measure of user development in the social network; and
wherein the utility score is determined independent of user input;
wherein defined relationships across the set of utility score instructions promote a first pre-defined type of content among less mature users of the social network relative to other maturities of other users of the social network and promote a second pre-defined type of content among more mature users of the social network relative to the other maturities of the other users of the social network; and
determining, based on the set of utility score instructions and the maturity score, utility scores for resources that are accessible to the user.

8. The one or more non-transitory machine-readable hardware storage devices of claim 7, wherein the operations further comprise:
receiving information identifying the user;
wherein determining the maturity score comprises:
determining, at least partly based on the information identifying the user, user attributes of the user; and
determining, based on the user attributes, the maturity score for the user.

9. The one or more non-transitory machine-readable hardware storage devices of claim 7, wherein the operations further comprise:
ranking the resources based on the utility scores.

10. The one or more non-transitory machine-readable hardware storage devices of claim 7, wherein the resources are ranked in accordance with relevance scores, and wherein the operations further comprise:
adjusting rankings of the resources based on the utility scores.

11. The one or more non-transitory machine-readable hardware storage devices of claim 7, wherein the utility score instructions comprise instructions for calculating, based on the maturity score, the utility scores; and
wherein determining the utility scores comprises:
determining, based on executing the utility score instructions, the utility scores.

12. The one or more non-transitory machine-readable hardware storage devices of claim 7, wherein the user comprises a first user, the maturity score comprises a first maturity score, the utility scores comprise first utility scores, and wherein the operations further comprise:
determining a second maturity score for a second user;
determining, based on the second maturity score, second utility scores for the resources; and
ranking the resources based on the second utility scores;
wherein the ranking of the resources based on the second utility scores vary from a ranking of the resources based on the first utility scores.

13. A system comprising:
one or more processing devices; and
one or more non-transitory machine-readable hardware storage devices storing instructions that are executable by the one or more processing devices to perform operations comprising:
determining, based on usage of a social network by a user, a maturity score for the user, where the maturity score represents a measure of user development of the user within the social network;
for a particular type of content associated with a resource,
retrieving, from a set of utility score instructions, a utility score instruction for the particular type of content;
wherein the utility score instruction defines, for the particular type of content in the social network, a relationship between a utility score and the maturity score;
wherein the utility score represents a measure of utility of the particular type of content to the user as defined by the measure of user development in the social network; and
wherein the utility score is determined independent of user input;
wherein defined relationships across the set of utility score instructions promote a first pre-defined type of content among less mature users of the social network relative to other maturities of other users of the social network and promote a second pre-defined type of content among more mature users of the social network relative to the other maturities of the other users of the social network; and
determining, based on the set of utility score instructions and the maturity score, utility scores for resources that are accessible to the user.

14. The system of claim 13, wherein the operations further comprise:
receiving information identifying the user;
wherein determining the maturity score comprises:
determining, at least partly based on the information identifying the user, user attributes of the user; and
determining, based on the user attributes, the maturity score for the user.

15. The system of claim 13, wherein the operations further comprise:
ranking the resources based on the utility scores.

16. The system of claim 13, wherein the resources are ranked in accordance with relevance scores, and wherein the operations further comprise:
adjusting rankings of the resources based on the utility scores.

17. The system of claim 13, wherein the utility score instructions comprise instructions for calculating, based on the maturity score, the utility scores; and
wherein determining the utility scores comprises:
determining, based on executing the utility score instructions, the utility scores.

18. The system of claim 13, wherein the user comprises a first user, the maturity score comprises a first maturity score, the utility scores comprise first utility scores, and wherein the operations further comprise:
determining a second maturity score for a second user;
determining, based on the second maturity score, second utility scores for the resources; and
ranking the resources based on the second utility scores;
wherein the ranking of the resources based on the second utility scores vary from a ranking of the resources based on the first utility scores.

* * * * *